US009828129B2

(12) United States Patent
Geble

(10) Patent No.: US 9,828,129 B2
(45) Date of Patent: Nov. 28, 2017

(54) DEEP-DRAWING PACKAGING MACHINE WITH SEALING STATION

(71) Applicant: Multivac Sepp Haggenmüller GmbH & Co. KG, Wolfertschwenden (DE)

(72) Inventor: Christian Geble, Mittelberg (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 865 days.

(21) Appl. No.: 14/185,647

(22) Filed: Feb. 20, 2014

(65) Prior Publication Data

US 2014/0237942 A1   Aug. 28, 2014

(30) Foreign Application Priority Data

Feb. 22, 2013   (EP) .................................... 13156424

(51) Int. Cl.
*B29C 65/18*   (2006.01)
*B65B 59/04*   (2006.01)
(Continued)

(52) U.S. Cl.
CPC ............ *B65B 59/04* (2013.01); *B29C 31/006* (2013.01); *B29C 65/18* (2013.01); *B29C 65/7841* (2013.01); *B29C 66/53461* (2013.01); *B29C 66/8167* (2013.01); *B29C 66/8322* (2013.01); *B29C 66/849* (2013.01); *B29C 66/876* (2013.01); *B29C 66/8742* (2013.01);
(Continued)

(58) Field of Classification Search
CPC ....... B65B 59/04; B65B 7/164; B65B 7/2878; B65B 9/04; B65B 9/045; B30B 15/028; B29C 66/816–66/8169; B29C 66/8322; B29C 31/006; B29C 65/18
USPC .................. 483/1, 28; 100/224, 226, 229 R; 53/559–561; 425/451.9, 595
See application file for complete search history.

(56) References Cited

U.S. PATENT DOCUMENTS 2,996,025 A  *  8/1961  Georgeff ................ B21D 37/14
                                                    100/214
3,111,100 A  *  11/1963  Georgeff ................ B21D 37/04
                                                    100/224
(Continued)

FOREIGN PATENT DOCUMENTS

DE    102004051923 A1    5/2006
DE    102011015561 A1    10/2012
(Continued)

*Primary Examiner* — Stephen F Gerrity
*Assistant Examiner* — Joshua Kotis
(74) *Attorney, Agent, or Firm* — Husch Blackwell LLP

(57) ABSTRACT

A deep-drawing packaging machine that includes a sealing station and a method for changing the sealing frame together with the sealing plate at the sealing station. The sealing station includes a sealing plate and a sealing frame. The sealing plate may be releasably coupled to an upper sealing tool part, and the sealing frame may be slidably removable at a lower sealing tool part. The sealing frame may be slidable on rails. The sealing frame may include one or more centering aids for aligning the sealing plate with respect to said sealing frame during removal thereof. The centering aids may be displaceable underneath a film web by the upper sealing tool part during the clamping of the film web between the sealing frame and the upper sealing tool part.

9 Claims, 6 Drawing Sheets

(51) Int. Cl.
  B29C 65/78 (2006.01)
  B29C 31/00 (2006.01)
  B65B 47/06 (2006.01)
  B65B 9/04 (2006.01)
  B29L 31/00 (2006.01)
  B29C 65/00 (2006.01)
  B29C 51/08 (2006.01)
  B65B 51/14 (2006.01)
  B65B 61/06 (2006.01)
  B65B 61/08 (2006.01)
  B65B 31/04 (2006.01)

(52) U.S. Cl.
  CPC ............... B65B 9/04 (2013.01); B65B 47/06 (2013.01); *B29C 51/08* (2013.01); *B29C 66/0014* (2013.01); *B29C 66/112* (2013.01); *B29C 66/131* (2013.01); *B29C 66/8432* (2013.01); *B29L 2031/7162* (2013.01); *B65B 31/04* (2013.01); *B65B 51/14* (2013.01); *B65B 61/065* (2013.01); *B65B 61/08* (2013.01); *Y10T 29/49716* (2015.01)

(56) References Cited

U.S. PATENT DOCUMENTS

| | | | | |
|---|---|---|---|---|
| 3,691,720 A * | 9/1972 | Anderson | ............... | B65B 31/02 228/219 |
| 3,754,374 A * | 8/1973 | Haines | ............... | B65B 11/50 53/329.3 |
| 4,056,922 A * | 11/1977 | Schilte | ............... | B29C 65/18 156/583.5 |
| 4,691,500 A * | 9/1987 | Danforth | ............... | B65B 7/2878 156/69 |
| 4,787,839 A * | 11/1988 | Morse | ............... | B30B 15/028 100/918 |
| 5,010,714 A * | 4/1991 | Medwed | ............... | B29C 43/021 29/521 |
| 5,129,254 A * | 7/1992 | Keizer | ............... | B21D 37/14 100/229 R |
| 5,534,282 A * | 7/1996 | Garwood | ............... | B65D 25/102 426/396 |
| 5,619,913 A * | 4/1997 | Padovani | ............... | B29C 31/006 100/215 |
| 6,024,820 A * | 2/2000 | Ozawa | ............... | B29C 63/02 156/212 |
| 6,499,271 B1 * | 12/2002 | Lastovich | ............... | B65B 7/162 53/329.2 |
| 6,527,266 B1 * | 3/2003 | Yonezawa | ............... | B23Q 1/0081 269/309 |
| 6,953,331 B2 * | 10/2005 | Bokich | ............... | B22D 17/22 425/192 R |
| 7,497,065 B2 * | 3/2009 | Schiebout | ............... | B29C 65/18 493/189 |
| 8,266,869 B1 * | 9/2012 | Liu | ............... | B29C 65/18 156/583.7 |
| 2002/0072456 A1 * | 6/2002 | Ichikawa | ............... | B21D 28/12 483/1 |
| 2009/0301658 A1 * | 12/2009 | Vine | ............... | B65B 7/164 156/497 |
| 2011/0139661 A1 | 6/2011 | Ludwig | | |
| 2012/0289387 A1 * | 11/2012 | Ehrmann | ............... | B29C 51/26 483/1 |

FOREIGN PATENT DOCUMENTS

| | | |
|---|---|---|
| EP | 0467069 A1 | 1/1992 |
| EP | 1520682 A1 | 4/2005 |
| FR | 2928626 A1 | 9/2009 |
| WO | 2007107703 A1 | 9/2007 |
| WO | 2011055325 A2 | 5/2011 |

* cited by examiner

DEEP-DRAWING PACKAGING MACHINE WITH SEALING STATION

CROSS-REFERENCE TO RELATED APPLICATIONS

This application claims priority to European Application Number 13156424.7 filed Feb. 22, 2013, to Christian Geble entitled "Deep-Drawing Packaging Machine with Sealing Station and Method," currently pending, the entire disclosure of which is incorporated herein by reference.

FIELD OF THE INVENTION

The invention relates to a deep-drawing packaging machine having a sealing station comprising a sealing frame and a sealing plate, and a method of changing the sealing frame and the sealing plate at the sealing station of the deep-drawing packaging machine.

BACKGROUND OF THE INVENTION

DE 10 2004 051 923 A1 discloses a deep-drawing packaging machine with a sealing station which is designed to allow a sealing plate to rest on a lower sealing tool part together with a base plate comprising heating elements, a cover plate, a pressure plate and a further base plate as a common assembly. This common assembly is releasably attached to a housing of an upper sealing tool part. This configuration permits the accessibility for changing or servicing the tools is permitted. To be able to remove the sealing plate from the assembly and to also change parts of the lower sealing tool part which are designed depending on format, the assembly is withdrawn from the machine as a unit, and the sealing plate may be screwed off from the base plate outside the deep-drawing packaging machine.

EP 0 467 069 A1 shows a deep-drawing packaging machine with a forming station and a sealing station each comprising lower tool parts that may be laterally pulled out of the deep-drawing packaging machine on rails in order to be able to change format-depending insets or dividers at the lower tool part without having to remove a film web above the lower tool parts.

Deep-drawing packaging machines are known in which the sealing plate is releasably connected to the upper sealing tool part with threaded joints which are accessible by an operator at the upper side of an upper sealing tool part. Before the sealing plate is released, however, film webs which are guided through the sealing station must be removed or cut out such that, after having loosened the threaded joints, the operator can reach under the still heated sealing plate with one hand, which is protected by a heat-resistant safety glove, to grip the sealing plate with his/her hand and remove it from the sealing station. Such handling is on the one hand dangerous as often a still very hot tool must be gripped with one hand, and on the other hand, relatively large and therefore heavy sealing plates can no longer be handled ergonomically with one hand in this manner. The assembly or insertion of the sealing plate into the upper sealing tool part is difficult, especially because usually only a small gap between the outer contour of the sealing plate and the matching inner contour of the upper sealing tool part is provided. The sealing plate must be held at the upper sealing tool part manually until it is sufficiently, or at least partially, fastened.

Thus, there is a need in the art for an improved sealing plate and sealing frame configuration for a sealing station of a packaging machine and a method for removing or replacing such sealing plate and sealing frame that makes it easier and safer to remove and/or change the sealing plate and sealing frame.

SUMMARY OF THE INVENTION

It is the object of the present invention to facilitate the operation of changing a sealing frame and a sealing plate of a sealing station of a deep-drawing packaging machine and to make the operation of changing the sealing frame and the sealing plate safer.

The deep-drawing packaging machine according to the invention may comprise a sealing station that may include a lifting device, a sealing plate, and a sealing frame. The sealing plate may be releasably disposed at an upper sealing tool part, and the sealing frame is releasably disposed at a lower sealing tool part. The deep-drawing packaging machine may be characterized in that the sealing frame includes centering aids for centering the sealing plate on the sealing frame. The centering aids may be designed such that they may be displaced by the upper sealing tool part underneath the film web when a film web is clamped between the sealing frame and the upper sealing tool part. Thus, this configuration allows a film web to be clamped between the sealing frame and the upper sealing tool part around its entire periphery and create a chamber in which the package may be evacuated and/or treated with gas before being sealed with a lid film. In this process, the centering aid only exerts forces that do not damage the film web and do not lead to the formation of folds of the film web within the sealing station.

The centering aids do not have to be removed from the sealing frame manually after the sealing plate has been replaced, resulting in an automatic centering of the sealing plate on the sealing frame. The sealing plate may be placed onto the sealing frame between or onto the centering aids manually; and during the movement of the sealing plate and the sealing frame using the lifting device in the direction of the upper sealing tool part, the sealing plate remains in a position fixed by the centering aids to be able to travel into the upper sealing tool part in an accurate position and without collision or further adjustment to align the sealing plate with respect to the fasteners.

Preferably, the sealing plate may be received by the sealing frame. For example, the sealing frame is located in an upper position in which it is in contact with the sealing plate. The fastening of the sealing plate at the upper sealing tool part is released and the sealing plate is lying with its weight on the sealing frame. In this embodiment, an access to the heated sealing plate by an operator is not intended or required.

In an advantageous embodiment, the lower sealing tool part may be laterally moved out of the deep-drawing packaging machine together with the sealing frame and the sealing plate to change the sealing frame and the sealing plate. In this lateral changing position, the sealing plate and the sealing frame are ergonomically easily accessible by the operator, and the heated sealing plate may thus be changed by using the sealing frame that is not heated, thereby reducing the risk to the technician.

Preferably, the sealing plate may be fixed to the upper sealing tool part using threaded joints, and the fasteners (threaded fasteners) are accessible to a technician from outside the upper sealing tool part. As an alternative, the sealing plate may be automatically fixed to the upper sealing tool part using at least one actuator. The advantage of both designs resides in that, in case of a change of the format division of the packages, only the sealing plate as a component cooperating with the packages must be changed and not the complete upper sealing tool part, optionally with its heating elements, its cooling water circuit and operating elements for generating a sealing pressure, for example the use of a membrane to generate sealing pressure as known in the art. This reduces efforts and time for retooling the deep-drawing packaging machine and also reduces the risk of injuries by a still very hot sealing plate.

Preferably, the sealing frame may include centering aids located at two or more corners (more preferably at four corners) for orienting the corners of the sealing plate. A reduction of the clearance of the sealing plate with respect to the sealing frame allows the sealing plate and the sealing frame to exist with very small lateral clearances of the sealing plate within the upper sealing tool part, where the upper sealing tool part may comprise a congruent recess at the inner surface for receiving the sealing plate.

Preferably, a centering aid comprises one or several pins that may be spring-loaded. The spring-loaded pins may be preferably lowered or retracted into the sealing frame in a moving direction of the lifting device such that the film web is not damaged. This embodiment permits a structurally simple and thus also inexpensive construction.

A pneumatic actuation of the pins, where the spring-loading of the pins could be eliminated, is also conceivable.

The method according to the invention for changing the sealing frame and the sealing plate together at a sealing station of a deep-drawing packaging machine includes: lifting the sealing frame upwards to an upper sealing tool part using a lifting device after film webs have been removed from in-between the upper sealing tool part and the sealing frame, releasing the sealing plate from the upper sealing tool part to deposit the sealing plate on the sealing frame, and lowering the sealing frame and the sealing plate using the lifting device, wherein centering aids provided at the sealing frame cooperate to align the sealing plate with the sealing frame. The alignment with the sealing frame also aligns the sealing plate with the upper sealing tool part so that when re-inserted into the sealing station, the sealing plate aligns with the fasteners which couple the sealing plate to the upper sealing tool part.

The centering aids do not have to be removed from the sealing frame manually after the sealing plate has been replaced, resulting in an automatically acting centering of the sealing plate on the sealing frame.

Preferably, the sealing frame and the sealing plate may be laterally moved out of the deep-drawing packaging machine in a lower changing position of the lifting device to grant access to the sealing frame and the sealing plate for replacement or servicing purposes. It is thus possible for an operator to ergonomically carry out retooling at the sealing station.

In an advantageous embodiment, the sealing frame lifts the sealing plate upwards to the upper sealing tool part using the lifting device to fix the sealing plate at the upper sealing tool part.

Preferably, the centering aids are displaced in the sealing frame as soon as the sealing plate has been fixed in the upper sealing tool part and the sealing frame is in contact with the upper sealing tool part.

Other aspects and advantages of the present invention will be apparent from the following detailed description of the preferred embodiments and the accompanying drawing figures.

DESCRIPTION OF THE SEVERAL VIEWS OF THE DRAWING

The accompanying drawings form a part of the specification and are to be read in conjunction therewith, in which like reference numerals are employed to indicate like or similar parts in the various views.

DETAILED DESCRIPTION OF THE INVENTION

The following detailed description of the present invention references the accompanying drawing figures that illustrate specific embodiments in which the invention can be practiced. The embodiments are intended to describe aspects of the present invention in sufficient detail to enable those skilled in the art to practice the invention. Other embodiments can be utilized and changes can be made without departing from the spirit and scope of the present invention. The present invention is defined by the appended claims and, therefore, the description is not to be taken in a limiting sense and shall not limit the scope of equivalents to which such claims are entitled.

Figure 1:
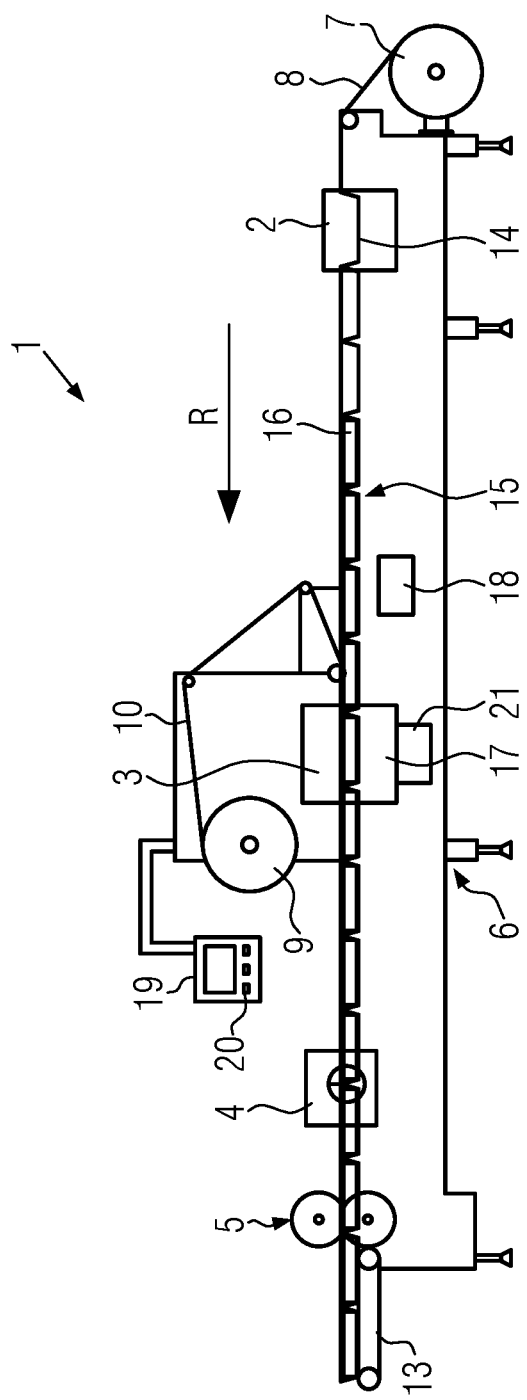
FIG. 1 is a schematic side view of a deep-drawing packaging machine in accordance with the teachings of the present invention.
Figure 7:
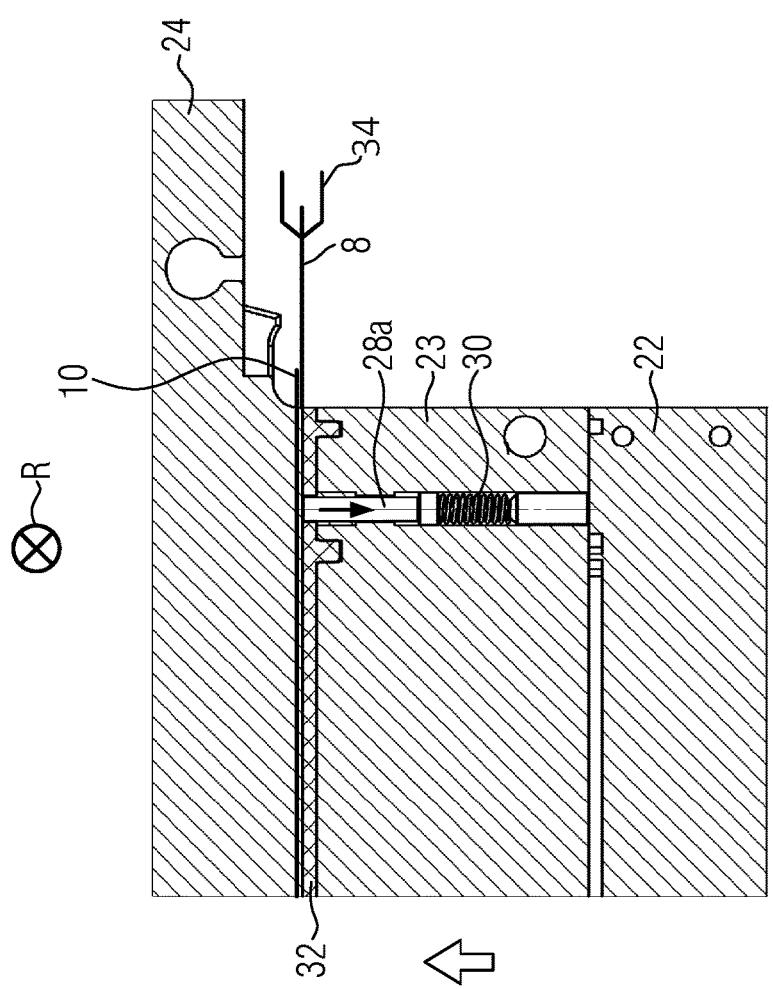
FIG. 7 is a sectional view of the sealing station of FIG. 2 cut along the line 7-7 wherein the sealing station is in a closed position.

FIG. 1 shows a deep-drawing packaging machine 1 according to the invention in a schematic view. The deep-drawing packaging machine 1 comprises a forming station 2, a sealing station 3, a transverse cutting unit 4, and a longitudinal cutting unit 5 which are disposed at a machine frame 6 in this sequence in a production direction R. At the entry side, a feed roller 7 is located at the machine frame 6 from which a film web 8 is unwound. In the region of the sealing station 3, a material storage 9 is provided from which a lid film 10 is unwound. At the exit side, a discharge apparatus 13 in the form of a conveying belt is provided at the deep-drawing packaging machine using which finished, singled packages are carried away. Furthermore, the deep-drawing packaging machine 1 comprises a feeder which grips the film web 8 and transports it further in the production direction R in each main cycle. The feeder may include, for example, clamps 34 attached to advancement chains (not shown) which are disposed on either side of the film as shown in FIG. 7.

In the shown embodiment, the forming station 2 is embodied as a deep-drawing station in which cavities 14 are formed into the film web 8 by deep-drawing. The forming station 2 may be designed such that several cavities are formed next to each other in the direction perpendicular to the production direction R. In the production direction R downstream of the forming station 2, an insertion section 15 is provided in which the cavities 14 formed in the film web 8 are filled with products 16.

The sealing station 3 has a lifting device 21 and a sealable chamber 17 in which the atmosphere in the cavities 14 may be replaced by a replacement gas or a gas mixture before sealing, for example by evacuation or gas flushing.

The transverse cutting unit 4 is embodied as a punching machine which cuts through the film web 8 and the lid film 10 between adjacent cavities 14 in a direction transverse to the production direction R. In this process, the transverse cutting unit 4 operates such that the film web 8 is not cut through across its total width, as the film may not be cut at least in an edge region. This permits a further transport by the feeder that is also controlled.

In the shown embodiment, the longitudinal cutting unit 5 is embodied as a knife arrangement with several rotating revolving knives by which the film web 8 and the lid film 10 are cut through between adjacent cavities 14 and at the lateral edge of the film web 8, so that there are singled packages downstream of the longitudinal cutting unit 5.

The deep-drawing packaging machine 1 furthermore comprises a control unit 18. The latter has the task of controlling and monitoring the processes running in the deep-drawing packaging machine 1. A display device 19 with operational controls 20 serves to visualize or influence the process operations in the packaging machine 1 for or by an operator.

The general working manner of the packaging machine 1 will be briefly described below. The film 8 is reeled off from the feed roller 7 and transported into the forming station 2 by the feeder. In the forming station 2, cavities 14 are formed in the film web 8 by deep-drawing. In a main cycle, the cavities 14 are transported further, together with the surrounding area of the film web 8, to the insertion section 15 where they are filled with products 16.

In the main cycle, the filled cavities 14 are subsequently transported further to the sealing station 3, together with the surrounding area of the film 8, by the feeder. The lid film 10 is transported further with the feed motion of the film web 8 after an operation of sealing it to the film web 8. In the process, the lid film 10 is reeled off from the material storage 9. By sealing the lid film 10 onto the cavities 14, closed packages are formed which are singled in the subsequent cutting operations 4 and 5 and transported out of the deep-drawing packaging machine 1 using the discharge apparatus 13.

A group of cavities 14 which are formed into the film web 8 in the forming station 2 during one cycle and which are then intermittently transported in the production direction R, is defined as a format. One format may comprise several packages or cavities 14 both in the production direction R and transverse to it, for example 4×4 cavities. In case of a format change from 4×4 to 3×3 cavities, for example, parts of the forming station as well as parts of the sealing station 3, especially a sealing frame and a sealing plate, must be changed.

Figure 2:
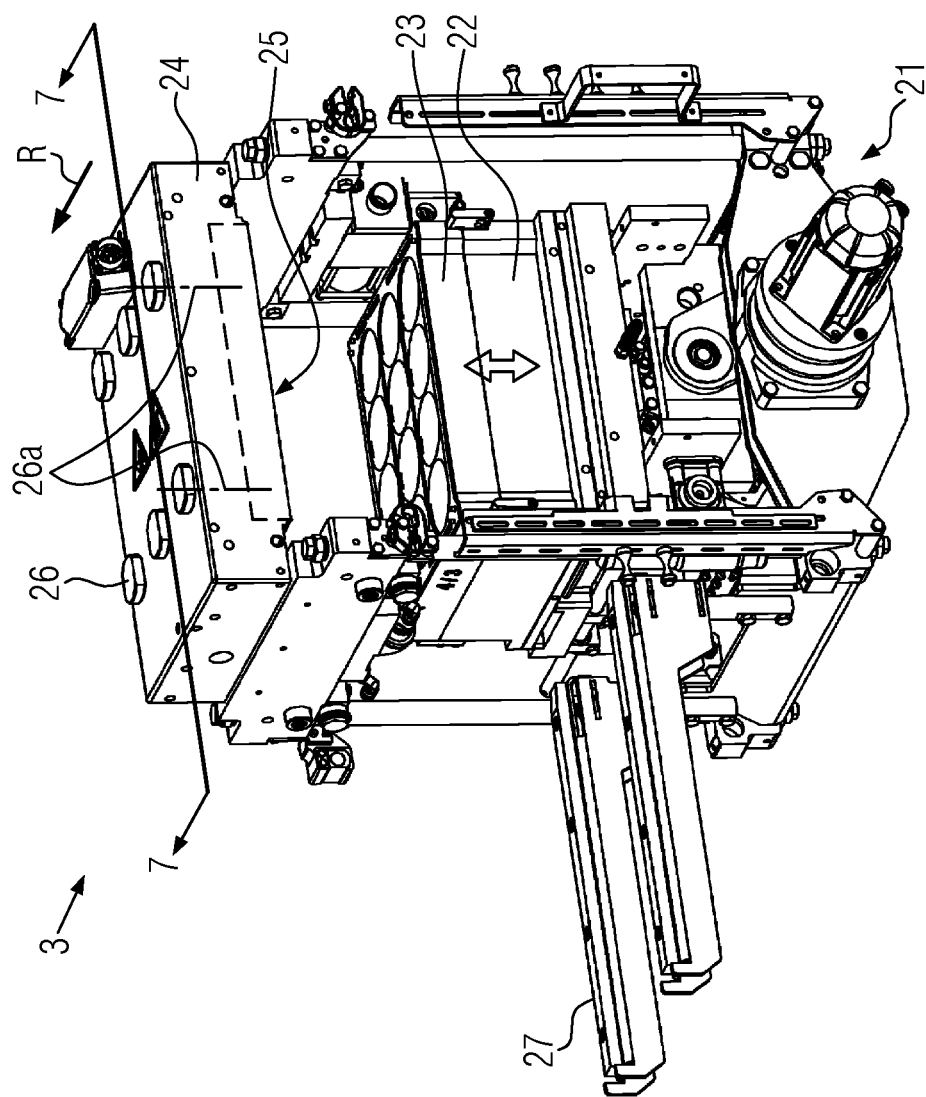
FIG. 2 is a front perspective view of a sealing station in accordance with the teachings of the present invention shown in an opened position.

FIG. 2 shows a sealing station 3 in an opened position. The lifting device 21 may move up and down a lower sealing tool part 22 with the format-dependent sealing frame 23 located on it. The sealing station 3 comprises an upper sealing tool part 24 at the top in which a sealing plate 25 is disposed. The sealing plate 25 is releasably fixed in the upper sealing tool part 24 using a fastener 26a, each fastener 26a may be covered by covers 26 such that an operator may access the threaded fasteners from outside the upper sealing too part 24 of the sealing station. In this example, six threaded fasteners 26a are provided as the fastener. However, other fastening methods, such as clamps, actuators, bolts, or any other method is within the scope of the present invention. At the sealing station 3, arms 27 may be provided transversely to and laterally of the production direction R to be able to laterally pull out the lower sealing tool part 22 on the arms 27.

Figure 3:
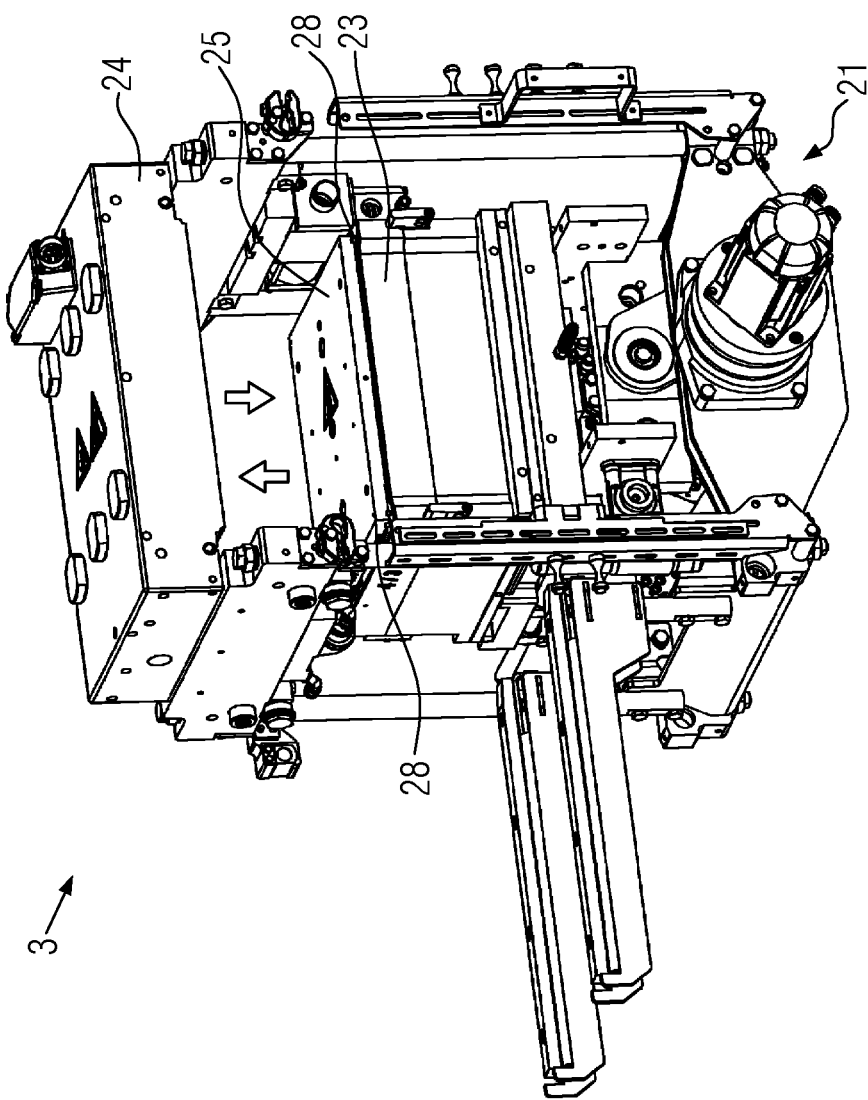
FIG. 3 is a front perspective view of the sealing station of FIG. 2 shown in a lower changing position after the sealing plate has been received by the sealing frame.

FIG. 3 shows the sealing station 3 in a lower changing position after the lifting device 21 has lifted the sealing frame 23 upwards to the upper sealing tool part 24 to receive the sealing plate 25 on the sealing frame 23 after the sealing plate 25 has been released from the upper sealing tool part 24 by releasing the threaded fasteners 26a. During a downward movement of the lifting device 21 (see arrows), the sealing plate 25 is resting on the sealing frame 23 and centered by pins 28 as centering aids. This is also the case during an upward movement of the lifting device 21, and it is all the more important for the sealing plate 25 to be able to enter into the upper sealing tool part 24 in an accurate position and without collision.

Figure 4:
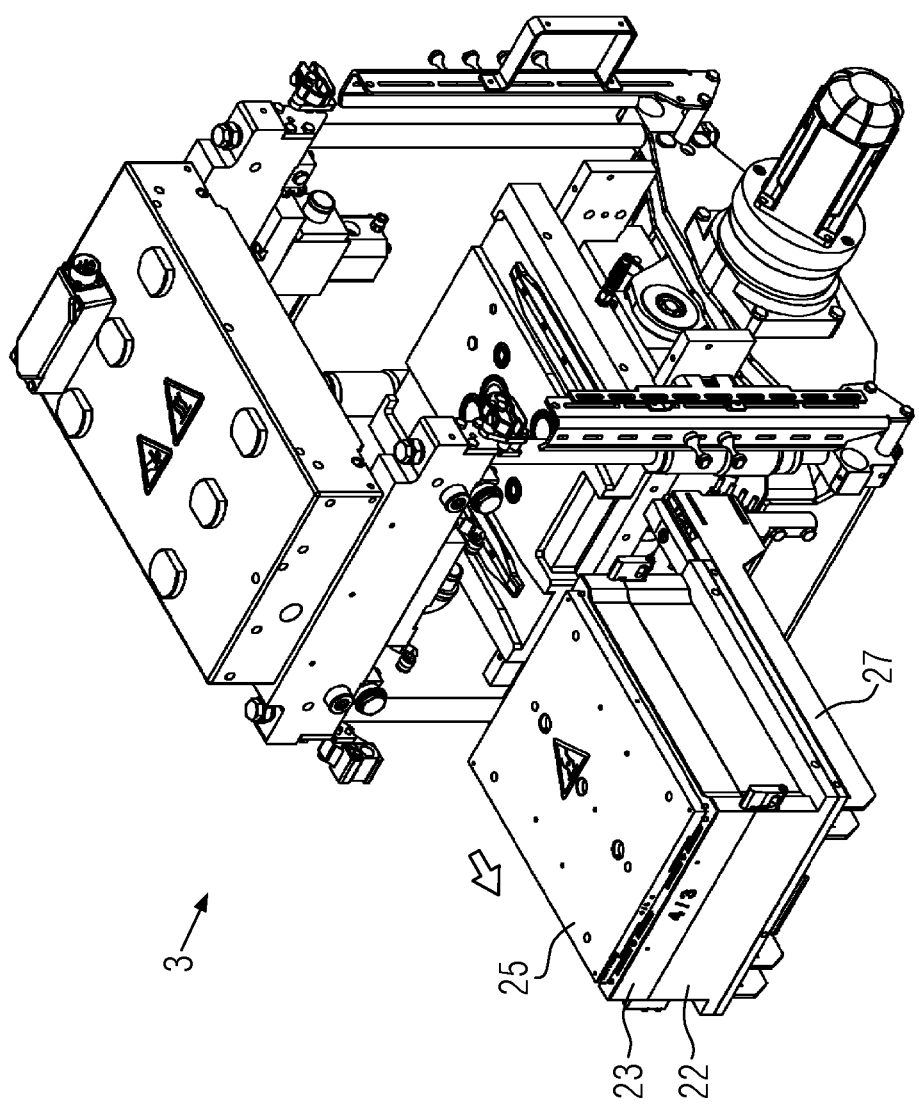
FIG. 4 is a front perspective view of the sealing station of FIG. 2 shown with the sealing frame and the sealing plate located at a lateral changing position.

In FIG. 4, the lateral changing position (see arrow) for the sealing frame 23 and the sealing plate 25 is shown, where both are resting on the lower sealing tool part 22. All three components 22, 23, 25 are laterally slidable and have been laterally pulled out of the sealing station 3 on the rail-like arms 27. While these parts 22, 23, 25 are located on the arms 27, an operator may ergonomically advantageously change the sealing plate 25 and the sealing frame 23 to retool the sealing station 3 to a new format or to just clean the sealing frame 23 and/or the sealing plate 25.

Figure 5:
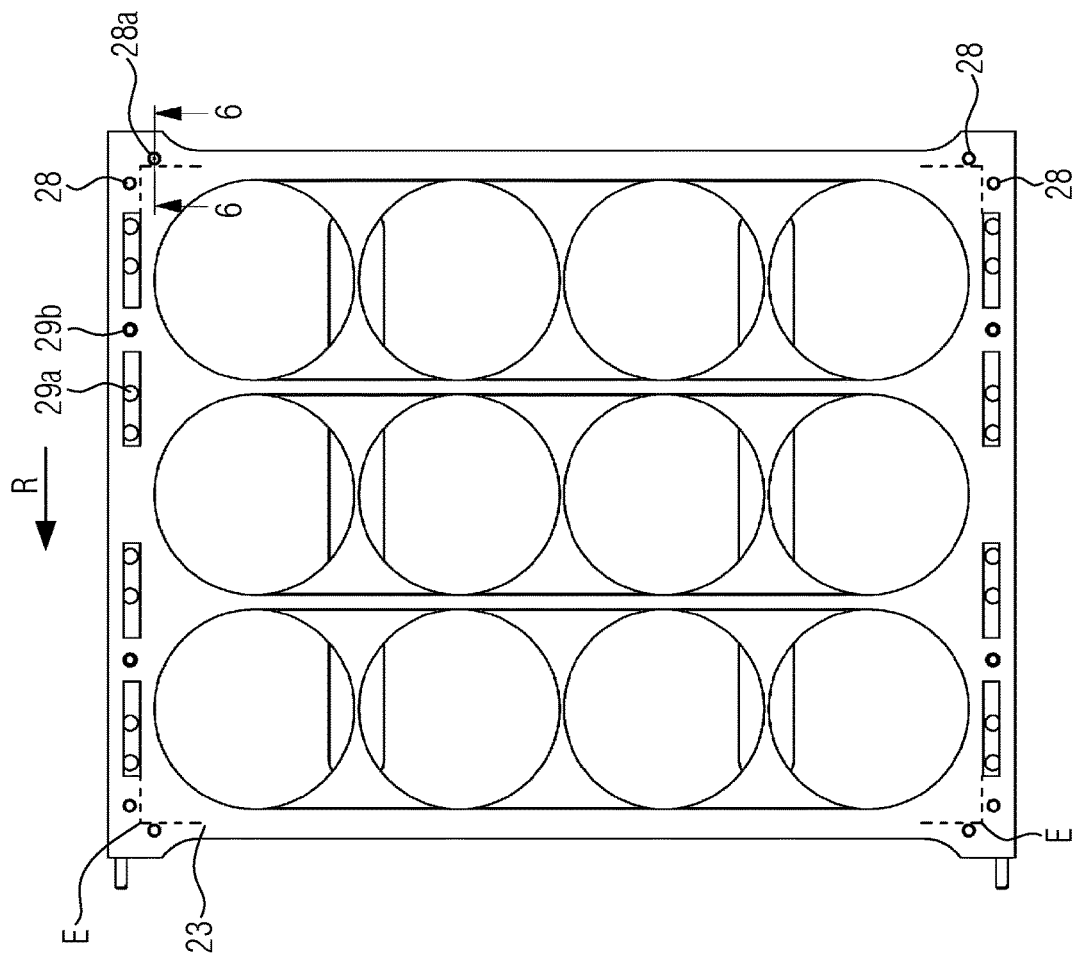
FIG. 5 is a top plan view of a the sealing frame in accordance with the teachings of the present invention.

FIG. 5 shows in a plan view the sealing frame 23 with a format for 4×3 cavities 14. At all four corners of the sealing frame 23, two pins 28, 28a each are provided as centering aids via which the sealing plate 25 or the corners E of the sealing plate 25 are aligned on the sealing frame 23. Corners E are indicated by dashed lines, are centered on the outer wall of sealing frame 23. Furthermore, sealing frame 23 may also include pins 29a for facilitating gas treatment and evacuation bores 29b for allowing for the removal gas or air from the packages during the sealing step.

Figure 6:
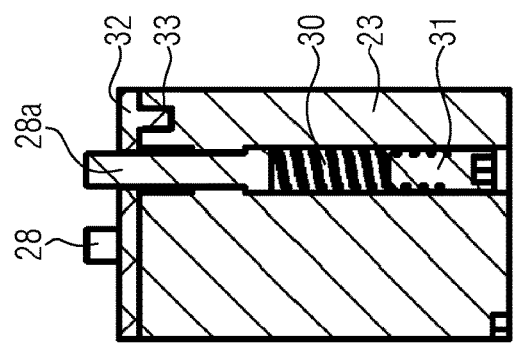
FIG. 6 is a sectional view of a centering aid of the sealing frame of FIG. 5 cut along the line 6-6.

In the upper right part of the representation of FIG. 5, a section 6-6 through the pin 28a is shown, which is shown enlarged in FIG. 6. The pin 28a is mounted in the sealing frame 23 via a pressure spring 30 and a screwed bolt 31 such that the pin 28a may be moved downwards and compresses the pressure spring 30 in the process. A sealing gasket 32, which may be manufactured from silicone, is provided on the sealing frame 23 and received in a groove 33 of the sealing frame 23 to at least help secure gasket 32 to sealing frame 23.

The functioning of the pins 28, 28a will be illustrated in more detail with reference to FIG. 7. FIG. 7 shows a partial detail as a sectional view through a pin 28a in the production direction R. The assembly of the lower sealing tool part 22, the sealing frame 23 disposed above it and the sealing gasket 32 clamps the film web 8 and the lid film 10 against the upper sealing tool part 24, so that a surrounding hermetical sealing along the outer dimension of the sealing gasket 32 and the sealing frame 23 to form a chamber 17 (see FIG. 1) for the evacuation and/or gas treatment of the interior of the package or the cavity 14 (see FIG. 1) is formed at least in film 8. The seal may be formed in both film 8 and 10. During the upward movement of the sealing frame 23 to the upper sealing tool part 24, just before the working position is reached, the pin 28a and all further pins 28 come into contact with their upper sides with the film web 8 which is resting against the bottom side of the upper sealing tool part 24, and they are pressed or lowered downwards, or retract, into the sealing frame 23 (see downward arrow), that means they are displaced underneath the film web 8. The pressure spring 30 is configured such that the spring force is only large enough for the pin 28a to automatically project again out of the sealing frame 23 in a downward movement using the lifting device 21 to center the sealing plate 25, and the pin 28a does not damage the film web 8 in the working position. This applies to all pins 28.

It is conceivable to provide, instead of the pins 28, molded parts as centering aids which cooperate, for example, each with a corner E of the sealing plate 25 on two sides to align the sealing plate 25 with respect to the sealing frame 23. The molded parts could have an L-shape, four molded parts being preferably provided. The molded parts may cooperate with one or several springs corresponding to the invention. The larger surface at the upper side of a molded part, compared to the pin 28, results in a lower surface pressure at the film web 8, and thus in a reduction of the load on the film web 8.

As is evident from the foregoing description, certain aspects of the present invention are not limited to the particular details of the examples illustrated herein. It is therefore contemplated that other modifications and applications using other similar or related features or techniques will occur to those skilled in the art. It is accordingly intended that all such modifications, variations, and other uses and applications which do not depart from the spirit and scope of the present invention are deemed to be covered by the present invention.

Other aspects, objects, and advantages of the present invention can be obtained from a study of the drawings, the disclosures, and the appended claims.

What is claimed is:

1. A deep-drawing packaging machine comprising:
   a forming station for forming one or more cavities in a packaging film web, wherein the film web is conveyed through the deep-drawing packaging machine in a production direction; and
   a sealing station for sealing the one or more cavities, the sealing station disposed downstream of said forming station in the production direction, the sealing station comprising:
   a lifting device;
   a sealing plate; and
   a sealing frame;
   said sealing plate being releasably arranged on an upper sealing tool part of the sealing station, and said sealing frame being releasably arranged on a lower sealing tool part of the sealing station, wherein said sealing frame comprises one or more centering aids for aligning said sealing plate with respect to said sealing frame when the sealing plate is released from said upper sealing tool part, wherein during a cavity sealing cycle of the sealing station, said one or more centering aids are movable between an extended position and a retracted position and said one or more centering aids are disposed underneath and come in contact with the film web, and wherein said one or more centering aids are moved to the retracted position to not damage the film web during a relative clamping movement of the sealing plate and the sealing frame.

2. The deep-drawing packaging machine of claim 1, wherein said sealing plate is received by said sealing frame.

3. The deep-drawing packaging machine of claim 1, wherein said lower sealing tool part, the sealing frame and the sealing plate are laterally slidable out of the deep-drawing packaging machine for changing the sealing frame and the sealing plate.

4. The deep-drawing packaging machine of claim 1, wherein said sealing plate is removably coupled to the upper sealing tool part by one or more threaded fasteners, and said threaded fasteners are accessible from outside the upper sealing tool part.

5. The deep-drawing packaging machine of claim 1, wherein said sealing plate may be automatically fixed to the upper sealing tool part using at least one actuator.

6. The deep-drawing packaging machine of claim 1, wherein the one or more centering aids are disposed at two or more corners of the sealing frame, wherein the sealing frame has a rectangular shape.

7. The deep-drawing packaging machine of claim 1, wherein said one or more centering aids comprises one or more spring-loaded pins.

8. The deep-drawing packaging machine of claim 7, wherein said spring-loaded pins are compressed to retract into the sealing frame in the retracted position.

9. A deep-drawing packaging machine comprising:
   a forming station for deep-drawing package cavities in a film web, wherein said film web is conveyed in a direction of production; and
   a sealing station disposed downstream of the forming station, the sealing station comprising:
   a lifting device;
   an upper sealing tool part and a lower sealing tool part, wherein the lower sealing tool part is operably connected to the lifting device;
   a sealing plate releasably arranged on the upper sealing tool part; and
   a sealing frame releasably arranged on the lower sealing tool part;
   wherein the sealing plate and the sealing frame are disposed on opposing sides of the film web and disposed for a relative clamping movement toward each other for clamping the film web during a sealing cycle of the sealing station;
   wherein said sealing frame comprises one or more centering aids for aligning said sealing plate with respect to said sealing frame when the sealing plate is released from the upper sealing tool part, wherein said centering aids are movable between an extended and a retracted position, wherein the extended position comprises said one or more centering aids projecting from a top surface of said sealing frame and said retracted position comprises said one or more centering aids being retracted at or below the top surface of said sealing frame; and
   wherein during the sealing cycle, said sealing frame and said centering aids are disposed underneath and come in contact with the film web, and the centering aids are moved into the retracted position during the relative clamping movement of the sealing plate and the sealing frame.

* * * * *